United States Patent
Güte et al.

(10) Patent No.: US 7,106,181 B2
(45) Date of Patent: Sep. 12, 2006

(54) METHOD FOR DETECTING AN OBJECT IN A DOOR OPENING OF A VEHICLE

(75) Inventors: Andeas Güte, Köln (DE); Frank Rohrmoser, Hallerndorf (DE); Arkadius Peter Szepanski, Hallerndorf (DE)

(73) Assignees: Siemens Aktiengesellschaft, Munich (DE); Fraba Vitector GmbH, Cologne (DE)

( * ) Notice: Subject to any disclaimer, the term of this patent is extended or adjusted under 35 U.S.C. 154(b) by 127 days.

(21) Appl. No.: 10/787,248

(22) Filed: Feb. 27, 2004

(65) Prior Publication Data

US 2004/0222883 A1    Nov. 11, 2004

(30) Foreign Application Priority Data

Feb. 28, 2003 (DE) ................. 103 08 878

(51) Int. Cl.
*B60Q 1/00* (2006.01)
(52) U.S. Cl. ............... 340/425.5; 340/686.1; 307/9.1
(58) Field of Classification Search ............ 340/426.28
See application file for complete search history.

(56) References Cited

U.S. PATENT DOCUMENTS 6,495,933 B1 * 12/2002 Tokuda et al. .............. 307/326
6,719,356 B1 * 4/2004 Cleland et al. ............ 296/146.8
6,782,759 B1 * 8/2004 Shank et al. .................. 73/780

FOREIGN PATENT DOCUMENTS

DE      199 34 880      1/2001

OTHER PUBLICATIONS

European Standard, "Railway Applications—Door Systems for Rolling Stock," European Committee for Electrotechnical Standardization, Mar. 2000, 7 pages.

* cited by examiner

*Primary Examiner*—Daniel Wu
*Assistant Examiner*—George Bugg
(74) *Attorney, Agent, or Firm*—Morrison & Foerster LLP

(57) ABSTRACT

A method for detecting an object in a door opening of a vehicle. A vehicle reaction is triggered if a received signal deviates from a setpoint value in a sensor system. When the door is closed an updated setpoint value is determined after the vehicle drives off. In order to determine the updated setpoint value, a sensor system which is capable of learning is briefly deactivated, specifically at a time occurring at least the customer-specifically selected time period after the vehicle drives off, if the door was opened while the vehicle was stopped.

4 Claims, 3 Drawing Sheets

TOP VIEW

TOP VIEW

METHOD FOR DETECTING AN OBJECT IN A DOOR OPENING OF A VEHICLE

CLAIM FOR PRIORITY

This application claims priority to German Application No. 10308878.4 which was filed in the German language on Feb. 28, 2003, the contents of which are hereby incorporated by reference.

TECHNICAL FIELD OF THE INVENTION

The invention relates to a method for detecting an object in a door opening of a vehicle, and in particular, to a door opening of a vehicle causing a vehicle reaction being triggered if a received signal deviates from a setpoint value in a sensor system.

BACKGROUND OF THE INVENTION

In vehicles, for example in buses and rail vehicles, it is customary to equip the doors in the closing region with an elastic section which protects trapped persons or objects against injury or damage. Methods have also been proposed which are suitable for detecting a person trapped in the door or a trapped object and triggering a suitable vehicle reaction. A suitable reaction is, for example in addition to the immediate opening of the door, to signal to the driver of the vehicle or even to disconnect the power supply to the drive.

In particular, a device in which the elastic section is hollow and the signal runs along in the cavity which is formed in this way is suitable for carrying out such a method. Generally, a transmitter and a receiver at opposite ends of the cavity are used for this. Suitable signals are ultrasonic or electromagnetic waves, in particular light.

It is also known to arrange a strip connector in the elastic section, which connector has two electrically conductive strips which can move with respect to one another. If a person or an object is trapped in the door, these strips touch one another generating a signal which indicates that trapping has occurred. In such a device, a comparison does not however take place between a received signal and a setpoint value.

According to the applicable standardization, all the methods and devices for detecting an object which is trapped in a door are to be capable of detecting objects with a cross section of 30 mm×60 mm.

However, it may be the case that relatively thin objects, for example an item of clothing or a belt, are trapped, which is very hazardous, in particular if the affected person is located outside the vehicle. If the vehicle is an underground train which is operated without a driver, the risk for persons is particularly high as there is no longer any monitoring of the platform by staff.

SUMMARY OF THE INVENTION

The invention discloses a method for detecting an object in a door opening of a vehicle, and for evaluating the measurements which also permit very thin trapped objects to be reliably detected. Furthermore, persistent changes to the edge of the door, for example particles of dust or else an incorrect closed position of the door leaves, are not to give rise to a vehicle reaction. In particular, signaling which indicates a trapped object or a trapped person is to be ignored if the respective door has not been closed shortly beforehand.

In one embodiment of the invention, when a door is closed, an updated setpoint value is determined after the vehicle drives off.

In the invention, persistent changes to the door do not give rise to continuous signaling and thus to unjustified vehicle reactions. If a door system has a relatively high degree of imprecision of closing, which may come about in the course of operation owing to wear or else owing to setting tolerances, such imprecisions do not lead to unjustified signaling. This is achieved in that, after the door closes and after the vehicle subsequently drives off, signaling is carried out sometime later, when the vehicle has already reached a relatively high speed, which provides an updated setpoint value. As a result, the persistent change is therefore prescribed as a setpoint state. A persistent change, which may be considered as nonhazardous, may be a foreign body which sticks tightly to the door or a else any persistent deformation of the elastic section or any possible closing imprecision of the doors, for example due to what is referred to as a misaligned closed position.

For example, a vehicle reaction is triggered in a time period between the closing of the door and the end of a customer specifically selected time period which starts when the vehicle next drives off after the door is closed.

This provides the advantage that significantly less incorrect signaling occurs. On the one hand, tampering with the door which has not been opened at all is prevented from being able to trigger signaling, and on the other hand the monitoring time period is limited even after the door closes. It is specifically no longer necessary to detect a trapped object or a trapped person if the vehicle has reached a high speed. The detection is carried out instead while the vehicle is stationary or at least within a customer specifically selected time period after the vehicle drives off. This time period is to be selected in such a way that in this time period it is not possible for the vehicle to have yet reached a high speed so that damage can still be prevented. Depending on the customer, this time period may be, for example, between four seconds and twelve seconds.

Delays in the operation of the vehicle are therefore avoided as incorrect signaling is largely ruled out. In a sensor system which is capable of learning, the power of a transmitter of the sensor system is continuously changed by an evaluation unit in a standardization process until the received signal has a desired quality level. This received signal is then used as a setpoint value.

Using this standardization process ensures that the sensor system is in working order and that the setpoint value is not assumed to be too large. Given an excessively high transmitting power, and thus excessively high setpoint value, the method would in fact be impossible to carry out with sufficient precision. Only relatively thick objects would then be detected.

According to one advantageous embodiment of the invention, after the door has been closed during a hold time, the sensor system is deactivated by the evaluation unit for at least a customer-specifically selected time period after the vehicle next drives off following this hold time, and re-activated again after a short time, in order to trigger a determination of an updated setpoint value in a new standardization process.

This provides the particular advantage that persistent changes which occur after opening and closing of the door cannot lead to a vehicle reaction later on in the driving operation. By determining an updated setpoint value, in each case the state which is obtained after the driving-off phase during the journey is evaluated as a setpoint state of the doors. Therefore, persistent changes, such as wear to the doors or adhering foreign bodies on the door, are advantageously no longer registered and cannot lead to incorrect signaling.

The signal is, for example, a wave propagating in a cavity, the cavity being located in an elastic section which bounds a closing surface of the door opening. Such a cavity is a particularly suitable location for propagating a signal which is intended to detect an instance of trapping. In the case of a trapped object, the elastic section is in fact deformed and the cavity is made narrower.

The transmitter and receiver of the sensor system are oriented, for example, obliquely with respect to the longitudinal axis in the cavity. If the cavity is unchanged, the signal is passed, from the transmitter to the receiver after multiple reflection at the boundary wall of the cavity. Only a small change in the shape of the boundary wall owing to a trapped object changes the signal profile and prevents the signals from passing completely to the receiver. The method is thus particularly sensitive and can reliably detect very thin trapped objects.

For example, the signal is an ultrasonic sound signal and the material of the section can reflect sound waves.

According to another embodiment, the signal is comprised of electromagnetic waves, for example light, and the material of the section can reflect such electromagnetic waves.

The evaluation unit is connected, for example via a bus, to a transmitter for regulating power.

The invention provides one advantage that even doors which are not aligned precisely and also adhering foreign bodies cannot trigger incorrect signaling. Little expenditure is therefore necessary to align the doors. The closing surfaces do not need to run precisely in parallel. Even thin trapped objects can always reliably be detected without costly maintenance operations.

BRIEF DESCRIPTION OF THE DRAWINGS

The invention is explained in more detail below with reference to the drawings.

DETAILED DESCRIPTION OF THE INVENTION

Figure 1:
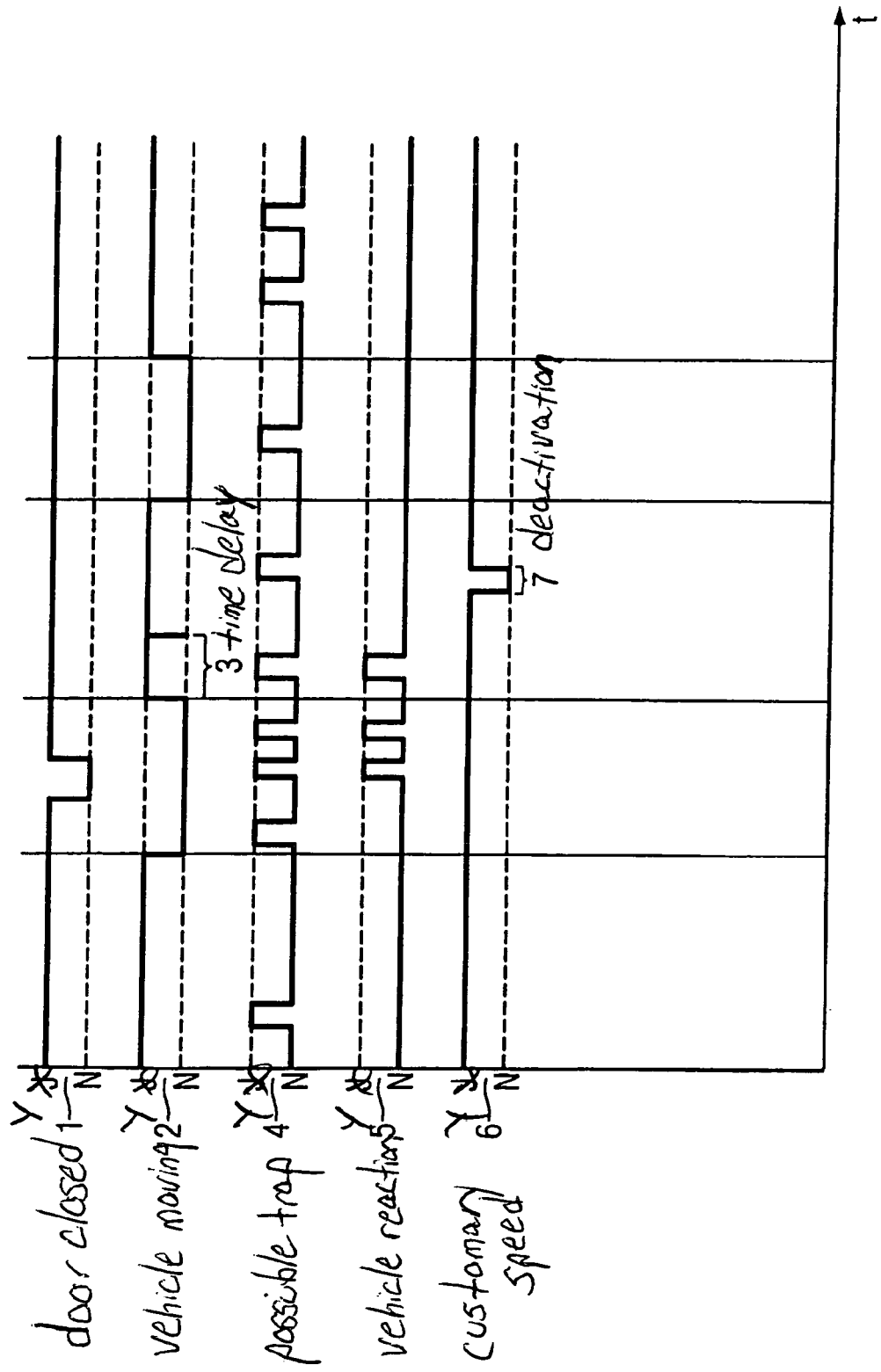
FIG. 1 shows a profile of a journey, registered events which could be due to a trapped body, and the resulting vehicle reactions and the actuation state of the sensor system.

In FIG. 1, the abscissa is the time axis. The individual profiles which take place simultaneously to one another each have either the position Y or N. Y stands for "Yes" or "applicable" and N stands "No" or "not applicable". The first profile 1 shows whether the door is closed. The second profile 2 shows whether the vehicle is traveling. In the second time period shown, the vehicle is therefore stationary, and within this time period the door is temporarily opened. A customer specifically selected time period 3 is defined whenever the door was opened while the vehicle was stopped. The third profile 4 shows any events which could constitute a case of trapping in the door. They are also due, for example, to persons touching the door, in particular the elastic section on the door, while the vehicle is traveling.

The fourth profile 5 indicates which events of the third profile 4 lead to a vehicle reaction being triggered. This vehicle reaction may only be a signal to the driver of the vehicle, but it may also signify that the drive is switched off, in particular in the case of driverless operation of an underground train. Such a vehicle reaction is permitted only when the door is open, and then until the vehicle drives off, and additionally also for a customer-specifically selected time period 3 after the driving off. This time period 3 is shown in the second profile 2. A vehicle reaction 5 is therefore limited to the relevant time from the opening of the door to the end of the driving-off phase of the vehicle after the door closes. At all other times, a reaction to a measurement at the sensor is not necessary.

So that the setpoint value with which a received signal is compared can always be adapted to persistent changes to the door, the entire sensor system, as is shown by the fifth profile 6, is briefly deactivated 7 if the vehicle has reached is customary speed again whenever the door has closed. Since it is customary that the sensor system always sets, as a setpoint value, the smallest value at which a receiver still just registers the transmission signal, it is necessary to start this process again after each closing operation so that persistent changes to the door are taken into account by the setpoint value. Such persistent changes may be adhering foreign bodies in the closing region or else a wear-related skewed position of the doors.

Figure 2:
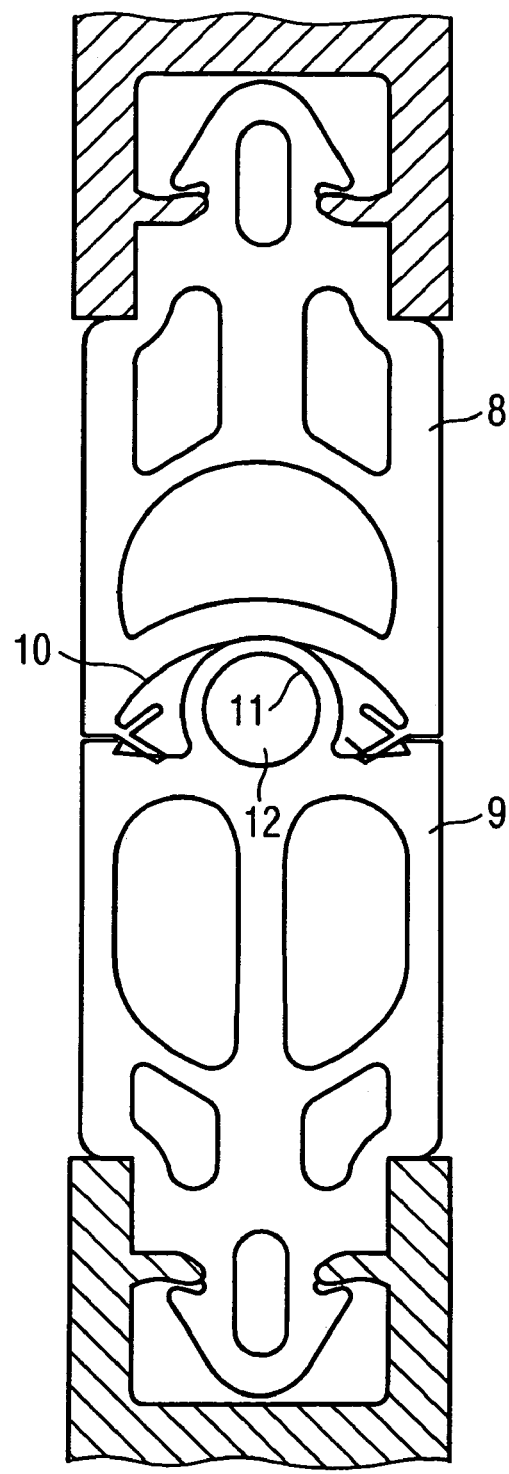
FIG. 2 shows a suitable device for carrying out the invention in a cross section.

Particularly suitable door sections 8 and 9 for carrying out the method are shown in FIG. 2. These elastic sections 8 and 9 are assigned to two doors. These doors close by pushing the two sections 8 and 9 against one another. These may be tilting doors or sliding doors.

The first elastic section 8 has, on its end face, a recess 10 in whose region there is an extension 11 of the second section on closed doors. In the extension 11 there is a perpendicularly extending cavity 12. A transmitter 13 and a receiver 14 for electromagnetic waves are arranged in this cavity 12.

Figure 3:
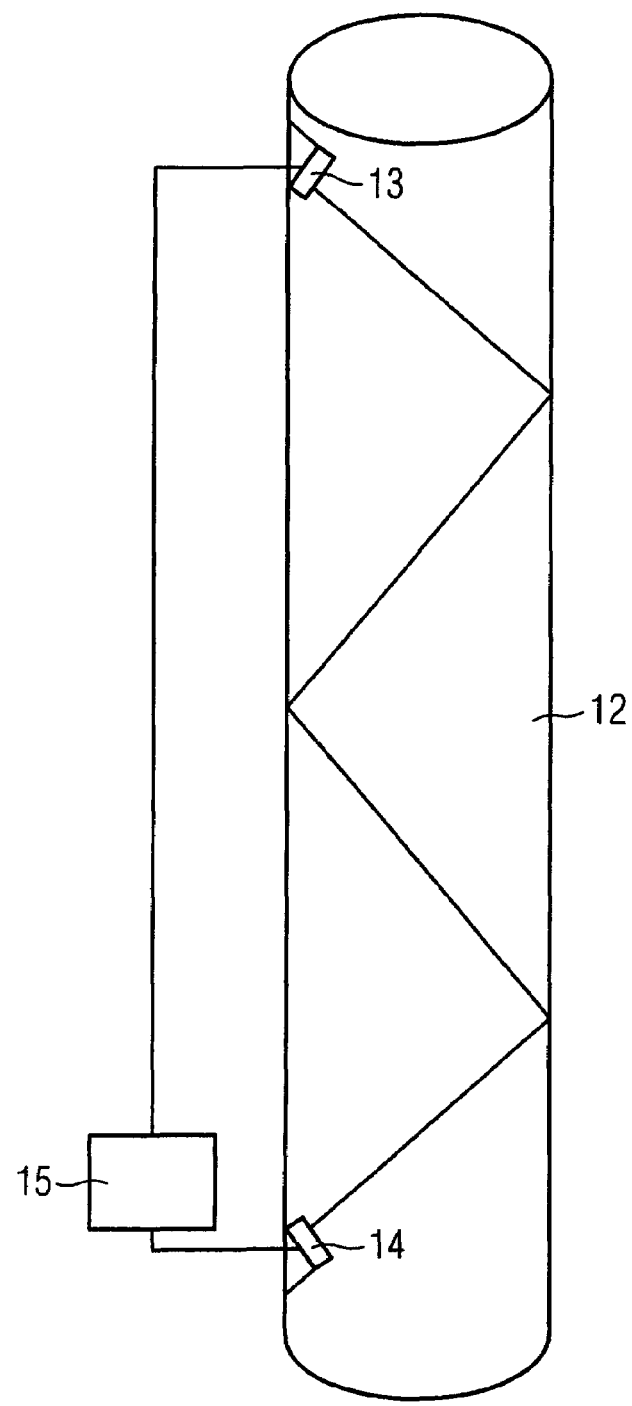
FIG. 3 shows a schematic view of the profile of a wave in a cavity of a section.

FIG. 3 is a schematic illustration of the cavity 12 as the interior of a cylinder. In the figure, the transmitter 13 is in the upper region of the cavity 12. Waves are propagated from the transmitter 13 and are reflected repeatedly on the inner surface of the cavity 12 until they reach the receiver 14. The reflection of the electromagnetic wave is already changed owing to a slight deformation of the cavity 12 as a result of an object which is trapped between the sections 8 and 9, and only an attenuated signal is received at the receiver 14. The transmitter 13 and the receiver 14 are connected to an evaluation unit 15 in which the received signal is compared with a current setpoint value.

What is claimed is:

1. A method for detecting an object in a door opening of a vehicle, where a vehicle reaction is triggered when a received signal deviates from a setpoint value in a sensor system, and, when the door is closed, an updated setpoint value is determined each time the vehicle drives off.

2. The method as claimed in claim 1, wherein the vehicle reaction is triggered between closing of the door and an end of a predetermined time period and which starts when the vehicle drives off after the door closes.

3. The method as claimed in claim 1, in which, when a sensor system is configured for learning, continuously changing the power of a transmitter of the sensor system using an evaluation unit until the received signal reaches a threshold, the received signal serving as a setpoint value, wherein the sensor system is deactivated, after a hold time for predetermined time, period after the vehicle drives off following the hold time, and re-activated after determination of an updated setpoint value.

4. The method as claimed in claim 1, wherein the signal is a wave which propagates in a cavity, and the cavity is located in an elastic section of a closing surface of the door opening.

* * * * *